J. B. HAMBLIN.
Manufacture of Solid-Shank Cast-Steel Rakes.
No. 227,521. Patented May 11, 1880.
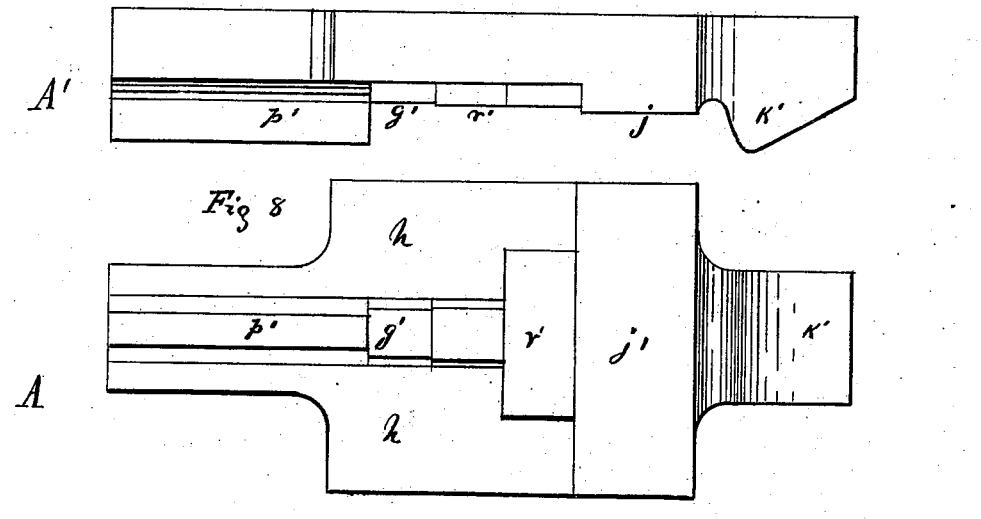
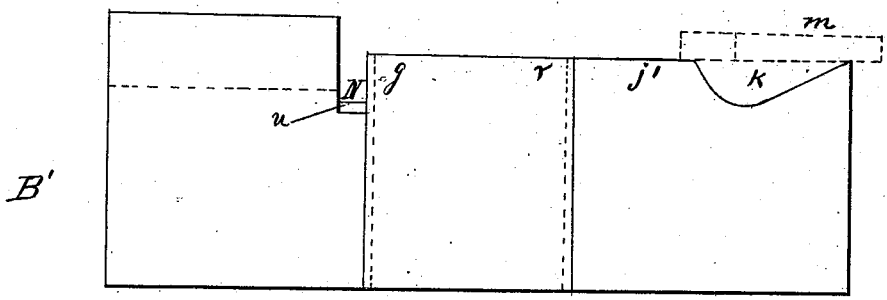
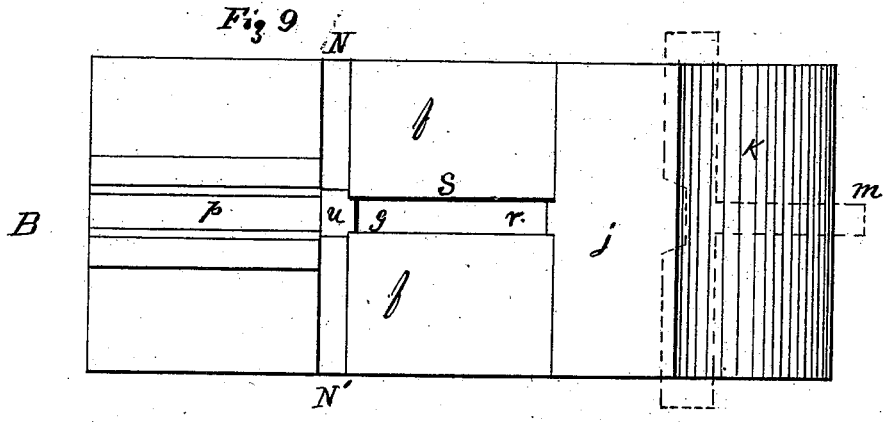
Witnesses
M. C. Walcott.
E. A. Walcott
Inventor
James Hamblin
per Geo D Walcott
Attorney

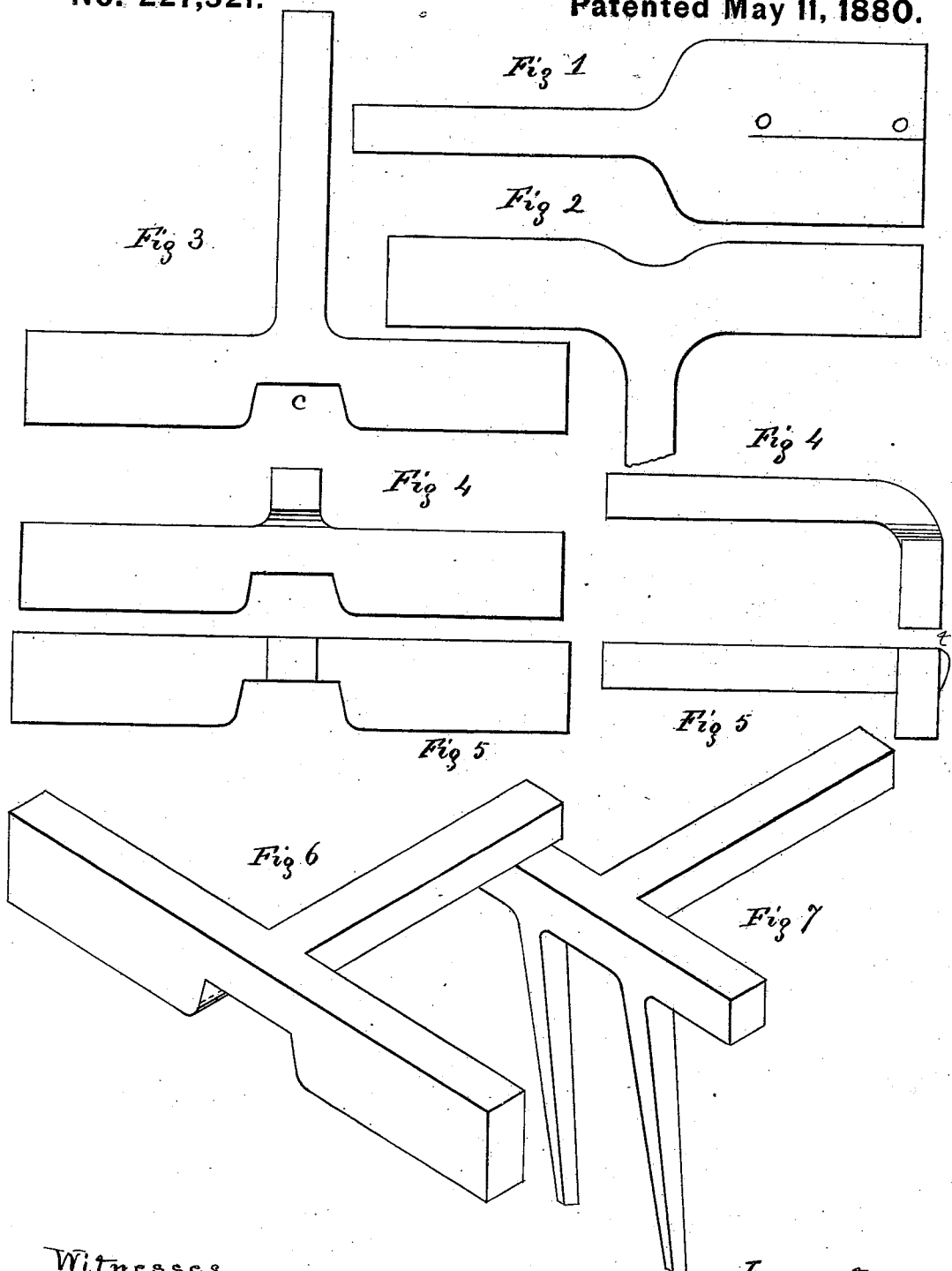

UNITED STATES PATENT OFFICE.

JAMES B. HAMBLIN, OF JACKSON, MICHIGAN, ASSIGNOR TO THE WITHINGTON & COOLEY MANUFACTURING COMPANY, OF SAME PLACE.

MANUFACTURE OF SOLID-SHANK CAST-STEEL RAKES.

SPECIFICATION forming part of Letters Patent No. 227,521, dated May 11, 1880.

Application filed July 19, 1878.

*To all whom it may concern:*

Be it known that I, JAMES B. HAMBLIN, of the city of Jackson, county of Jackson, and State of Michigan, have invented a new and useful Improvement in the Manner of Constructing a Solid-Shank Cast-Steel Rake, of which the following is a specification.

The invention relates to that class of rakes made from cast-steel by cutting and drawing the teeth from one edge of a bar of steel, while the opposite edge forms the head of the rake.

Previous to this a solid-shank rake has been made by Calvin T. Beebe, of Jackson, Michigan, in which the shank is made to take its position by twisting the bar of the rake between the two middle teeth.

I am aware of Mr. Beebe's application for a patent for his improvement in the manufacture of rakes filed July 19, 1878, and do not claim anything embraced therein.

This invention consists in forcing the shank of a solid-shank cast-steel rake, which is naturally forged on the edge of the bar forming the head of the rake, into its proper position, projecting from the side of said bar, without twisting the head.

In the accompanying drawings, in which similar letters refer to like parts, Figure 1 is a rake-pattern after shank is drawn on one end and pattern split; Fig. 2, pattern turned out ready to be straightened and set down in center between the two middle teeth. Fig. 3 is a pattern after the shank has been drawn, the bar split, turned out, straightened, and set down ready for the operation of placing the shank in its proper position; Fig. 4, the rake-pattern after the first operation of forcing the shank into position; Fig. 5, the rake-pattern after the second operation of forcing the shank into position; Fig. 6, the rake-pattern after the shank has been forced into place; Fig. 7, the same as Fig. 6 with two teeth drawn.

In making a solid-shank cast-steel rake in accordance with my invention it is first necessary to have the steel of twice the width, but of same thickness, as is usually used for making cast-steel rakes. On one end of a pattern of any desired length I first draw a shank of proper size and length, and next split the pattern, as shown in Fig. 1, along the line *o o*. It is then opened, as shown by Fig. 2. The further operation of fitting the pattern is done in a press by means of the set of dies shown on Sheet 2, Fig. 8, A A', and Fig. 9, B B', the several parts of which are described as follows: The dies *j j'* are plain flat surfaces five or six inches long and one and one-half inch wide, and approach each other to within three-eighths of an inch, or the thickness of rake-head. Between these surfaces the pattern receives its first operation after being opened out from splitting. The dies *f f* of the lower set are also flat surfaces placed apart from each other to form the slot S, and are high enough above the surface upon which they rest to allow of placing the shank of rake on end therein, while the edge of rake-head bar rests on *f f*.

The dies *h h* on A A' are also plain flat surfaces, with the piece *g'* projecting the proper height, and of width to form the depression *c*, (shown in Fig. 3.) when, in second operation, the pattern Fig. 2 is put between the dies, the shank on end at *g* in the slot S, and the bar on edge across the dies *f f*.

The surfaces *h h* and the projecting piece *g'* on upper die, by an operation of the press, leave the pattern as shown by Fig. 3.

The dies thus far described are not new; but in combination with them I have constructed the dies K K', N N', and *p* for working the shank from its position projecting from the edge of pattern, as shown by Fig. 3, to a position projecting from the side of the pattern, as shown by Fig. 6.

K is a depression in and extending across the lower die.

K' is a corresponding projection on the upper die for bending shank, as first operation of placing shank in proper position.

N N' is a groove in lower die, of width and depth equal to that of the rake-pattern, as shown by Fig. 3, extending across the lower die, with the piece *u* in the center, of height and width equal to depression formed in pattern, Fig. 3, at *c*.

*p* is another groove connected with and at right angles to N N', of same width of shank at bottom; but to allow for crooks in shank, and the more readily to place pattern in position, its sides are raised above the other dies, and it is made wider at top than at bottom. The depth of groove $p$ is equal to the thickness of the shank below the surfaces $ff$.

$p'$ on the upper die is a narrow piece, of same width as shank on lower edge, and extending the length of groove $p$ and across groove N N', and is intended to force the shank into groove $p$.

In the operation of the press there is the thickness of the shank in groove $p$ and width of rake-head in groove N N' between upper and lower dies.

Having described the dies, the following is the manner of using them for the purpose mentioned: The pattern, as shown by Fig. 3, is first placed on the lower die, K, in position shown by the dotted lines, the shank M extending to the right, and the bar of rake extending across the edge of the die $j$. By the operation of the press the upper die, K', forces the pattern into the die K, and we have it in the form shown by Fig. 4. The bar of the pattern then being placed in the groove N N', with the shank in the groove $p$, by an action of the press the shank is pressed down into the groove to the position indicated by the dotted line, leaving the pattern in shape shown by Fig. 5, with the projecting portion, caused by the upsetting of the shank into the bar of rake. This is forced back into the bar again by placing the shank in the slot S at $r$, when, by another motion of the press, the surface of upper die at $r'$ reduces the projecting part to the thickness of pattern. This operation also tends to elongate the bar and spread it in the opposite direction, and another operation of the press is required, the pattern being placed in the groove N N', with shank in groove $p$. As the result of these several operations we have the shank in the desired position, and as shown by Fig. 6. Fig. 7 is the same as Fig. 6, with teeth formed on the bar in the usual way.

What I claim is—

1. The hereinbefore-described method of forming the shank of a rake-head, which consists in bending the body of the shank or tang of the blank to about right angles with the bar, and then forcing or compressing into the bar that portion of the bent shank which stands above and joins the bar, substantially as set forth.

2. Jointly, the dies K' $j$ $r'$ $g'$ $p'$ $h$ and K $j'$ $f$ $f$ $r$ $u$ $p$ N N', substantially as and for the purpose set forth.

JAS. B. HAMBLIN.

Witnesses:
S. DROESING,
GEO. D. WALCOTT.